Oct. 18, 1938.    H. T. BRINK    2,133,654

GLASS MELTING FURNACE

Filed Oct. 19, 1936

INVENTOR.
HAROLD T. BRINK
BY Dorsey & Cole
ATTORNEYS.

Patented Oct. 18, 1938

2,133,654

UNITED STATES PATENT OFFICE 2,133,654

GLASS MELTING FURNACE

Harold T. Brink, Corning, N. Y., assignor to Corning Glass Works, Corning, N. Y., a corporation of New York Application October 19, 1936, Serial No. 106,473

1 Claim. (Cl. 263—15)

The present invention relates to glass melting furnaces and particularly to furnaces of the regenerative type using gas for fuel. In such a furnace there is usually provided a plurality or series of regenerative ports and the gas is ordinarily supplied to the furnace by burners placed adjacent to and communicating with such ports. The gas fuel, as it enters the furnace, unites with heated air which is being constantly forced or drawn therethrough and ignites and burns in the heating chamber of the furnace.

In a glass melting furnace it is very important that the design of the gas and air intake ports or manifolds be such that a sufficient volume of gas can be introduced into the furnace and mixed with a proper volume of air to support combustion without causing the propagation of flame in the form of a relatively inefficient turbulent torch.

An object of this invention is a furnace structure in which the burning mixture is so controlled as to propagate a flat uniformly distributed sheet of flame, free from turbulence, over the area to be heated.

A feature of this invention is a furnace structure having embodied in it horizontally disposed air intake ports beneath each of which a plurality of separately valved fuel intake ports are arranged above the glass level in the furnace with their openings faced in the same direction as are the openings of the air intake ports.

Figure 1:
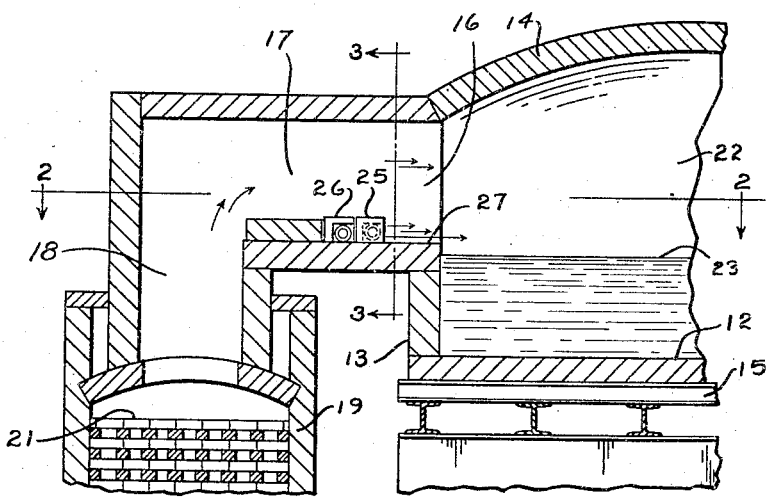
Fig. 1 is a transverse section through part of one of a pair of cooperating regenerators and substantially one-half of a furnace embodying the invention.
Figure 2:
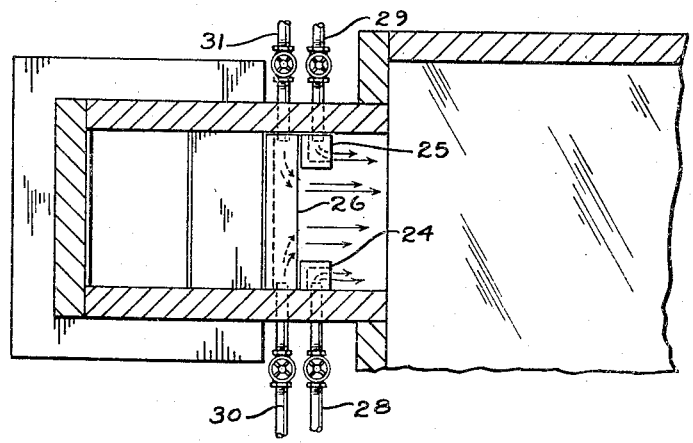
Fig. 2 is a sectional view taken on line 2—2 of Fig. 1.
Figures 3, 4:
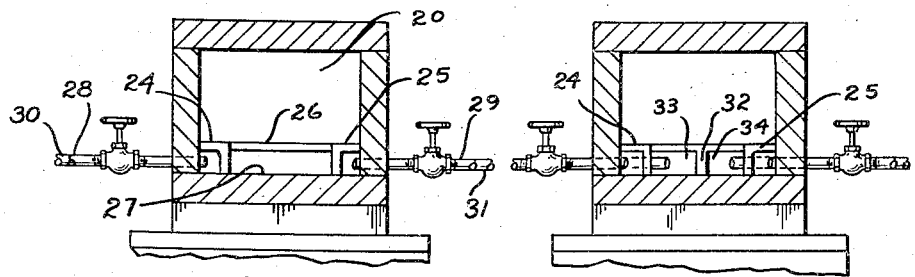
Fig. 3 is a sectional elevation taken on line 3—3 of Fig. 1.
Fig. 4 is a view similar to Fig. 3, illustrating a modified embodiment of the invention.

The furnace illustrated is of the well-known standard type including a tank having a bottom 12, sidewalls 13 and a cover arch 14, supported upon a suitable structure 15. Placed in the sidewalls just above the glass level are a plurality of cooperating regenerative ports 16. Communicating with these ports, by means of passages 17 and 18, are the usual regenerators 19. The passage 17 terminates at the port 16 in the form of a rectangular opening 20 (Fig. 3).

Air is first drawn into the regenerator 19 through the usual tunnel (not shown) and after passing up through the heated checker-work 21 and the passages 17 and 18, is delivered through port 16 to the vault 22 above the level of the glass or glass producing material 23.

Also communicating with each port 16 are fuel intake ports 24, 25 and 26 respectively, arranged in a single plane on the bottom 27 of passage 17. The ports 24 and 25 are provided with valved gas fuel supply pipes 28 and 29 and the central or larger port 26 is provided with oppositely disposed valved fuel supply pipes 30 and 31.

Since the openings of the fuel intake ports 24, 25, and 26 are arranged beneath the associated air intake port 16, and further, since the openings of both the air and fuel intake ports are faced toward the area to be heated, the fuel gas is directed on streams parallel to the air stream. The fuel and air accordingly mix with a minimum of disturbance of the air and fuel currents so that a flat ribbon-like flame is produced. Since the fuel intake ports are supplied from separately valved fuel lines, adjustment of velocity and intensity of the flame entering the furnace can be effectively controlled to meet varying velocities of air flow. Furthermore, regardless of the amount of fuel gas used, the valves may be adjusted to give uniform fuel distribution over the bottom of the furnace port.

In the embodiment of the invention illustrated in Fig. 4, the space between ports 24 and 25 is further divided by a partition 32, forming the intake ports 33 and 34, thereby affording a further refinement of the manifolding and fuel supply control.

What I claim is:

In a glass melting furnace, a melting tank, a regenerator structure for supplying preheated air to the melting tank through a passage extending between the regenerator and the melting tank, a fuel intake manifold extending across the passage with its only opening facing the tank; other relatively short manifolds arranged within the passage immediately in front of the respective end portions of said first manifold, having their only openings facing the tank, and separately valved fuel lines connected with the respective manifolds.

HAROLD T. BRINK.